United States Patent
McNeil et al.

(10) Patent No.: US 10,831,645 B1
(45) Date of Patent: Nov. 10, 2020

(54) DEVELOPER-BASED TEST CASE SELECTION

(71) Applicant: International Business Machines Corporation, Armonk, NY (US)

(72) Inventors: Kristin E. McNeil, Charlotte, NC (US); Itai Gordon, Modiin (IL); Radha Radha Mohan De, Howrah (IN); Miriam Nizri, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/516,234

(22) Filed: Jul. 18, 2019

(51) Int. Cl.
*G06F 11/36* (2006.01)
*G06F 9/44* (2018.01)
*G06N 7/00* (2006.01)

(52) U.S. Cl.
CPC ...... *G06F 11/3684* (2013.01); *G06F 11/3688* (2013.01); *G06N 7/005* (2013.01); *G06F 11/3608* (2013.01); *G06F 11/3668* (2013.01); *G06F 11/3692* (2013.01)

(58) Field of Classification Search
CPC ............. G06F 11/3684; G06F 11/3688; G06F 11/3668; G06F 11/3608; G06F 11/3692; G06F 21/554; G06N 7/005
See application file for complete search history.

(56) References Cited

U.S. PATENT DOCUMENTS

| | | | | |
|---|---|---|---|---|
| 8,868,981 B2* | 10/2014 | Glaser | ................ | G06F 11/3684 714/25 |
| 2007/0121824 A1* | 5/2007 | Agapi | ................ | H04M 3/5175 379/88.18 |
| 2012/0017195 A1* | 1/2012 | Kaulgud | ............ | G06F 11/3692 717/101 |
| 2013/0198565 A1* | 8/2013 | Mancoridis | ........... | G06F 21/554 714/26 |
| 2016/0274995 A1* | 9/2016 | Klein | .................. | G06F 11/3608 |
| 2016/0359992 A1* | 12/2016 | Nawab | .................... | H04L 67/18 |
| 2017/0123963 A1* | 5/2017 | Koren | ................ | G06F 11/3668 |

(Continued)

OTHER PUBLICATIONS

Tiago Almeida Fernandes, Sensor-Based Monitoring and Management of Software Artifacts, Jul. 8, 2016, [Retrieved on Aug. 13, 2020]. Retrieved from the internet: <URL: https://repositorio-aberto.up.pt/bitstream/10216/85508/2/145185.pdf>72 Pages (1-52) (Year: 2016).*

(Continued)

*Primary Examiner* — Anibal Rivera
(74) *Attorney, Agent, or Firm* — Kelsey M. Skodje (57) ABSTRACT

A developer is monitored by at least one sensor, and developer data is gathered from the at least one sensor. Code change data is gathered for changes made by the monitored developer to at least one area of code, and the code change data is mapped to the developer data. Test cases are run to test the at least one area of code, and to identify failed test cases. Code change data corresponding to the failed test cases is also identified, as well as developer data mapped to the corresponding code change data. Further, a prediction model that correlates test case failure with the developer data is generated. The prediction model is used to generate probabilities of failure for test cases based on a new developer data mapped to new code test data.

20 Claims, 5 Drawing Sheets

(56) References Cited

U.S. PATENT DOCUMENTS

2017/0309196 A1* 10/2017 Vangala ................. G06Q 50/22

OTHER PUBLICATIONS

Oleksii Kononenko et al., Code Review Qiality: How Developers See It, 2016 IEEE, [Retrieved on Aug. 13, 2020]. Retrieved from the internet: <URL: https://dl.acm.org/doi/abs/10.1145/2884781.2884840> 11 Pages (1028-1038) (Year: 2016).*

Muller et al., "Stuck and Frustrated or In Flow and Happy: Sensing Developers' Emotions and Progress," Zurich Open Reposity and Archive, 2015, 13 pages, https://doi.org/10.1109/ICSE.2015.334 Original Publication: 37th International Conferecne on Software Engineering , May 2015.

Wrobel, M., "Applicability of Emotion Recognition and Induction Methods to Study the Behavior of Programmers," Applied Sciences, 2018, 8, 323, pp. 1-19, DOI: 10.3390/app8030323.

Graziotin et al., "Software developers, moods, emotions, and performance," IEEE Software, vol. 31, No. 4, pp. 24-27, 2014, DOI: 10.1109/MS.2014.94 (Accepted (before copyediting and typesetting version—6 pages).

Graziotin et al., "Happy software developers solve problems better: psychological measurements in empirical software," PeerJ, Published: Mar. 11, 2014, pp. 1-23, DOI: 10.7717/peerj.289.

Tanaka et al., "Effects of Mental Fatigue on Brain Activity and Cognitive Performance: A Magnetoencephalography Study," Research Article, Anatomy & Physiology: Current Research, 5:S4, Published Jul. 23, 2015, 5 pages, DOI: 10.4172/2161-0940.S4-002.

Mann, C., "Why Software Is So Bad," MIT Technology Review, Jul. 1, 20020, 11 pages https://www.technologyreview.com/s/401594/why-software-is-so-bad/.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

DEVELOPER-BASED TEST CASE SELECTION

BACKGROUND

The present disclosure relates to software testing and, more specifically, to generating test suites cases based on predicted test case failure.

In software development, test suites are used to test new or altered code. Test suites include test cases for testing various functions of the software. The number and type of test cases that are run in a test suite can vary based on the type and complexity of the software and the code changes. Some test suites can be run automatically, while others are run manually.

SUMMARY

Embodiments of the present disclosure are directed to a system for selecting test cases. The system includes at least one processing component, at least one memory component, and at least one sensor configured to monitor a developer. The system also includes a data collection component configured to gather developer data from the sensors, gather code change data for changes made to at least one area of code by the developer, and map the code change data to the developer data (e.g., based on temporal relationships). Additionally, the system includes a test case selection component configured to determine that a first set of the developer data and a first set of the code change data have been gathered by the data collection component, to run test cases to test the at least one area of code, and to identify items of the first set of the code change data corresponding to each failed test case of the test cases. The test case selection component is also configured to identify developer data mapped to code change data corresponding to the failed test cases. The mapping can be based on temporal relationships. Further, the test case selection component is configured to generate a prediction model that correlates test case failure with developer data, which can be biometric data. The test case selection component is also configured to determine that a next set of the developer data and a next set of the code change data have been gathered by the data collection component, to generate probabilities of failure for the test cases based on the next sets of data, and to generate, based on the probabilities, a test suite. The test case selection component can also be configured to determine that a test case has a probability of failure above a threshold probability, and to omit the test case from the test suite. The system can also include a developer profile configured to store the developer data (e.g., biometric data) and code change data.

Additional embodiments of the present disclosure are directed to a method of selecting test cases. The method includes monitoring a developer with at least one sensor (e.g., an electrodermal activity sensor or another biometric sensor), gathering developer data from the at least one sensor, and gathering code change data for changes made by the monitored developer to at least one area of code. The method also includes mapping (e.g., based on temporal relationships) code change data for a first set of changes to a first set of developer data, and running test cases to test the at least one area of code. Further, the method includes identifying items of the code change data corresponding to failed test cases, identifying developer data mapped to this code change data, and generating a prediction model that correlates test case failure with developer data. The method also includes gathering new developer data from the at least one sensor, gathering new code change data for new code changes made by the monitored developer, and mapping the new developer data to the new code change data. Further, the method includes generating probabilities of failure for the test cases based on the prediction model, and generating a test suite based on the probabilities. Additionally, the method can include ranking the test cases from highest to lowest probability of failure, and ordering the test suite based on the ranking. The method can also include determining that a test case has a probability of failure above a threshold probability, and generating a report indicating the test case. Additionally, the method can include running the test suite to test the at least one area of code, identifying items of the new code change data corresponding to failed test cases, identifying new developer data mapped to this code change data, and updating the prediction model.

Further embodiments of the present disclosure are directed to a computer program product, which includes a computer readable storage medium having program instructions embodied therewith, the program instructions executable by a processor to cause the device to perform a method of selecting test cases. The method includes monitoring a developer with at least one sensor (e.g., a biometric sensor), gathering developer data from the at least one sensor, and gathering code change data for changes made by the monitored developer to at least one area of code. The method also includes mapping (e.g., based on temporal relationships) code change data for a first set of changes to a first set of developer data, and running test cases to test the at least one area of code. Further, the method includes identifying items of the code change data corresponding to failed test cases, identifying developer data mapped to this code change data, and generating a prediction model that correlates test case failure with developer data. The method also includes gathering new developer data from the at least one sensor, gathering new code change data for new code changes made by the monitored developer, and mapping the new developer data to the new code change data. Further, the method includes generating probabilities of failure for the test cases based on the prediction model, and generating a test suite based on the probabilities. Additionally, the method can include ranking the test cases from highest to lowest probability of failure, and ordering the test suite based on the ranking. Additionally, the method can include running the test suite to test the at least one area of code, identifying items of the new code change data corresponding to failed test cases, identifying new developer data mapped to this code change data, and updating the prediction model.

DETAILED DESCRIPTION

Software developers use test suites to test code at various stages of software development. The test suites test (e.g., exercise and/or stress) software in order to determine whether it contains errors or satisfies various requirements. Herein, "code" can refer to statements and/or instructions arranged in a computer program in which characters (e.g., letters, digits, etc.) are represented by binary numbers. Code can also refer to a set of instructions in the computer program, as well as specific constituent portions of code (e.g., lines of code). Code can contain defects, which are errors that cause the code to function in an undesired way. Code defects can also prevent the code from functioning at all.

A test suite is a set of one or more test cases selected to test at least one area of code. The test cases can detect differences between existing and required conditions, and analyze features of the software's code components. Further, the test cases can involve operating the system under selected conditions, and evaluating the system based on the results of these operations. Some test cases must be run manually, though others can be run automatically. In either case, running test suites can be time consuming and inefficient, particularly as software increases in complexity. For example, time and system resources can be wasted when test suites repeatedly test areas of code that do not contain errors.

Efficiency can be improved through strategies to detect code errors as early in the testing process as possible, and/or by testing only areas of code that are likely to contain defects. Test suites can optionally arrange test cases according to a hierarchy designed to test certain areas of code before other areas of code. This order of test cases can be based on importance of the code area, type of test, or other criteria. For example, a test suite can begin with test cases for testing areas of code that were most recently added or altered, as these areas may be more likely to contain errors. Test suites can also exclude test cases that are redundant or less likely to detect errors.

However, existing techniques for improving code testing efficiency are limited to prioritizing test cases based on code features such as whether the areas of code have been altered or are similar to other areas that contain errors. These techniques do not take into account factors that can lead to varying degrees of error between recently altered or similar areas of code. Therefore, existing code test techniques still consume significant amounts of unnecessary time and system resources.

Disclosed herein is a technique for generating test suites by predicting test case failure (e.g., caused by code defects) based on data collected from individuals who contributed to (e.g., wrote or otherwise edited) the code to be tested. The generated test suite prioritizes test cases based on a machine learning model that correlates test case failure with biometric data obtained from a software developer while the developer alters areas of code. Biometric data can be used to determine physiological states, which indicate level of attention, fatigue, and other factors that can affect the quality of the developer's work. The machine learning model improves the accuracy of test case failure prediction. This allows errors to be located earlier in the testing process, thereby saving system resources and the developer's time.

Figure 1:
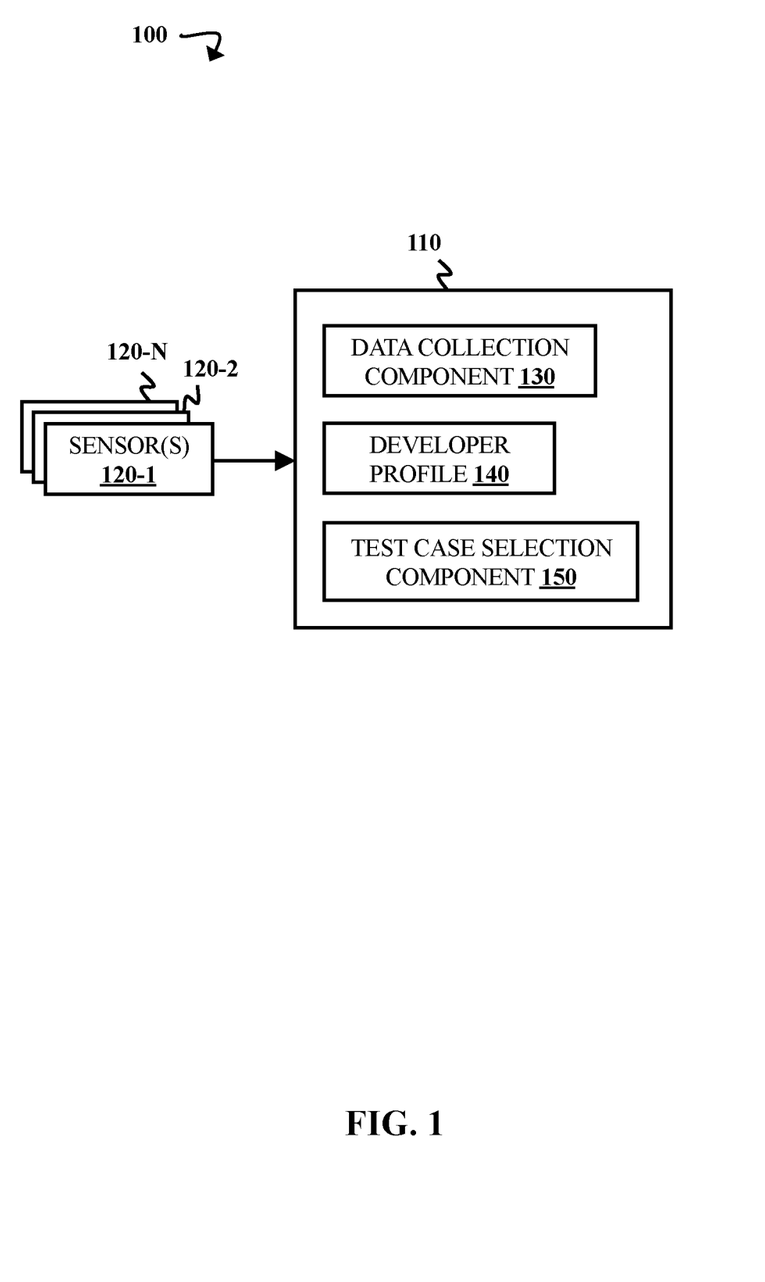
FIG. 1 is a block diagram illustrating a test case selection environment, according to some embodiments of the present disclosure.

FIG. 1 is a block diagram illustrating a test case selection environment 100, according to some embodiments of the present disclosure. The test case selection environment 100 includes a software testing environment 110 and sensors 120-1, 120-2, 120-N (collectively, "sensors 120"). While the sensors 120 are referred to in the plural form herein, in some embodiments there is only one sensor 120-1 included in the test case selection environment 100. Examples of sensors 120 can include cameras, microphones, electrodermal activity (EDA) sensors, blood volume pulse (BVP) sensors, pressure sensors, thermometers, electrophysiological sensors, etc. The sensors 120 can include more than one sensor of the same type (e.g., more than one camera) and/or more than one type of sensor.

The sensors 120 record data related to an individual who contributes to writing or editing code in the software testing environment 110. This individual is referred to herein as a "software developer" or "developer". The recorded data ("developer data") is biometric data related to the developer's physiological state. Examples of developer data can include electrodermal response values determined by EDA sensors, BVP, eye movements (e.g., angular velocity, saccadic amplitude, direction, frequency and duration of fixations, etc.), facial expressions (e.g., facial muscle movements identified in video frames using the facial action coding system (FACS)), body temperature, keystroke dynamics (e.g., typing speed, number of errors, and/or key pressure), and/or cursor movements. However, any appropriate measurements can be made (e.g., electroencephalography (EEG) or facial electromyography (fEMG)). Non-biometric developer data can also be collected in some embodiments, such as audio recordings of ambient noise levels at the developer's workstation, etc.

At least one of the sensors 120 can be included in at least one device worn by the software developer. For example, the developer can wear a smartwatch or wristband that includes EDA and BVP sensors. In another example, there can be an EDA sensor device fastened to the user's wrist, a BVP sensor device clipped to the user's earlobe, and/or an eye-tracking sensor in headset or pair of smart glasses. The sensors 120 can also be in external devices mounted in the developer's workstation (e.g., on the developer's computer monitor). For example, an eye-tracking device can be mounted in a position that allows it to monitor the developer's eye movements.

Additionally, at least one of the sensors 120 can be part of the same device as the software testing environment 110. For example, the software testing environment 110 can be implemented on a computer that includes sensors 120 such as a built-in microphone and/or camera, keyboard pressure sensors, and a touchscreen or pointing device (e.g., a computer mouse, trackball, etc.) from which cursor movements can be recorded. In some embodiments, developer data can also be entered by the software developer via a user interface presented on a computer monitor or mobile device screen (not shown). For example, the software developer can rate her mental state (e.g., level of focus or fatigue) on a rating scale (e.g., a visual analogue scale, Likert scale, rating of perceived exertion scale, etc.) when she is about to begin a session of writing/editing code and, optionally, at one or more intervals during the session.

The software testing environment 110 includes a data collection component 130, at least one developer profile 140, and a test case selection component 150. The data collection component 130 gathers the developer data from the sensors 120, as well as data related to code changes made by the monitored developer ("code change data"). The code change data can include the identities of modified files, methods, and/or functions; the number of lines of added or altered code; etc. The data collection component 130 also records the times at which items of developer data and code change data are collected. For example, items of developer data and code change data can be tagged with timestamps. The data collection component 130 also maps the developer data to the code change data based on temporal relationships. That is, items of developer data can be mapped to items of code change data having timestamps indicating the same or approximately the same times of collection.

The developer data and code change data are stored in developer profile 140 assigned to the software developer. For simplicity, a single developer profile 140 is illustrated in FIG. 1. However, the software testing environment 110 can include profiles for more than one developer. For example, the software testing environment 110 can test software composed of code contributed to by more than one developer. In these instances, there can be a developer profile 140 for each contributor. In other embodiments, the developer profile 140 stores developer data for more than one developer. For example, the developer profile 140 can optionally store developer data mapped to simultaneously collected code change data that is tagged with the identity of the responsible developer.

In some embodiments, the developer profile 140 can be a development team profile. For example, a team of developers working collaboratively can result in a single set of test case data with multiple sets of developer data. In these instances, the developer data can be used to generate values referred to herein as "developer team data". The developer team data can be any appropriate descriptive measure (e.g., mean, median, mode, maximum, minimum, quartiles, etc.) that represents the overall physiological state of the team while code is being written and edited.

The test case selection component 150 runs test suites to test code that has been altered by the monitored software developer. The test suites can be preexisting test suites from a repository of test suites (not shown), or test suites generated by selecting test cases from the repository. From the test suite results, the test case selection component 150 identifies failed test cases and code change data corresponding to the failed test cases (e.g., code change data associated with code areas and/or defects related to a failed test case). The test case selection component 150 then correlates the failed test cases with developer data mapped to the corresponding code change data.

The test case selection component also generates a machine learning model for the developer profile 140. The machine learning model is used to predict results of subsequent test cases based on the correlation between failed test cases and developer data. As subsequent code changes are made and tested by the developer, the data collection component 130 continuously updates the developer profile 140 with new developer and code change data. The test case selection component 150 uses this data and subsequent test case results to update the machine learning model. Techniques for generating and updating the machine learning model are discussed in greater detail with respect to FIG. 2.

The test case selection component 150 also determines probabilities of failure for test cases that can be used to test the altered code (e.g., at least one test case in a test case repository). In some embodiments, the test case selection component 150 ranks the test cases based on likelihood of failure. The test case selection component 150 can also flag test cases that have probabilities of failure higher than a threshold probability of failure. Further, the test case selection component 150 generates at least one test suite by selecting, excluding, and/or hierarchically ordering test cases based on their probabilities of failure. Flagging test cases and generating test suites are discussed in greater detail with respect to FIG. 2.

Figure 2:
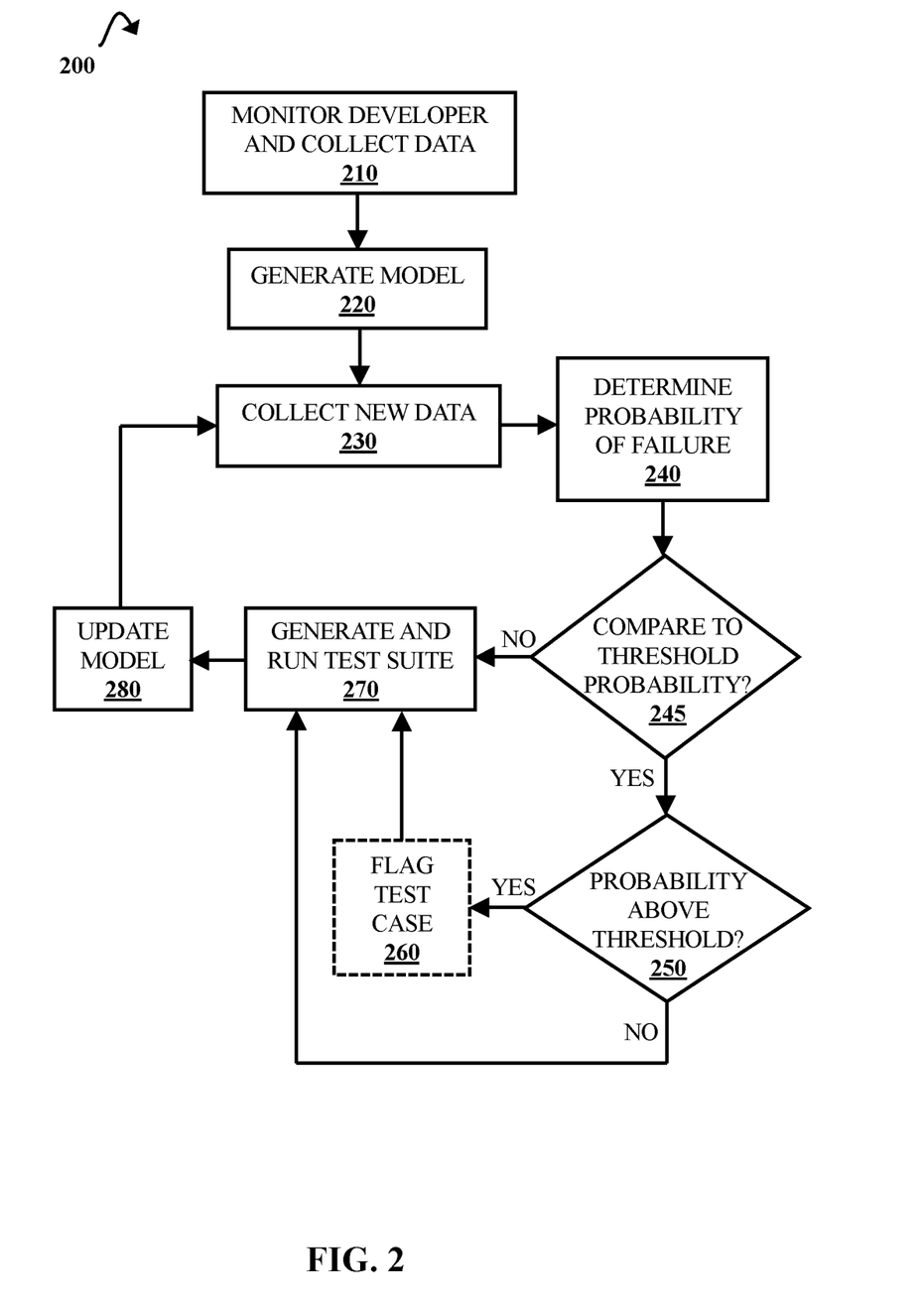
FIG. 2 is a flow diagram illustrating a process of generating a test suite, according to some embodiments of the present disclosure.

FIG. 2 is a flow diagram illustrating a process 200 of generating a test suite, according to some embodiments of the present disclosure. To illustrate process 200, but not to limit embodiments, FIG. 2 is described within the context of the test case selection environment 100 of FIG. 1. Where elements described with respect to FIG. 2 are identical to elements shown in FIG. 1, the same reference numbers are used in both Figures.

Process 200 includes gathering code change data, developer data, and test case data. This is illustrated at step 210. The developer data (e.g., biometric data) is collected from a software developer by one or more sensors 120. A data collection component 130 gathers the developer data from the sensors 120, as well as code change data for code alterations input by the monitored developer. The data collection component also tags the developer and code change data with timestamps, and adds the tagged data to a developer profile 140. The data collected at step 210 can optionally be training data. For example, the monitored developer can edit and test a training set of code before working on a particular project.

The data collection component 130 also maps the code change data to temporally related developer data. For example, an item of code change data can be mapped to an item of developer data when each item has a timestamp indicating that it was recorded at a given time or within a given length of time (e.g., timestamps within a period of 10 seconds (sec), 30 sec, 1 minute (min), 10 min, 30 min, etc.). Items of developer data can be individual measurements. For example, a developer's heart rate can be measured once every 15 minutes by a BVP sensor. The individual items of code change data can then be mapped to items of developer data (e.g., measures of heart rate) having the closest timestamps. However, developer data can also be collected continuously as a function of time. In these instances, temporally related items of developer data can be values or ranges of values that were recorded at times corresponding exactly or approximately to code change data timestamps.

Test case data is also collected by the data collection component 130. The test case data includes the results of tests involving the code added or changed at step 210. In order to generate the test case data, the code is tested using any appropriate test cases. For example, one or more test suites for testing various functionalities can be run automatically or manually. The identity and order of test cases in the test suite can be selected automatically or by the software developer or other user. The test suite can also be selected from a repository of preexisting test suites. The selection of test cases can depend upon the type of software, the changes made to the software, the functionality to be tested, and the software's stage of development, as will be understood by a person of ordinary skill in the art. The generated test case data indicates whether each test case passed or failed. In addition, the test case data identifies defects and portions of code associated with the failed tests.

The collected data is used to generate a model for predicting whether code changes entered by the developer will result in test case failure. This is illustrated at step 220. From the test case data, the test case selection component 150 identifies failed test cases. The test case selection component 150 also locates code change data corresponding to the failed test cases. The corresponding code change data is code change data related to the defects and portions of code associated with the test failures. For example, if the failure of a test case is caused by a defect in a particular file, the test case selection component 150 locates code change data in the developer profile 140 for code changes involving the file.

The test case selection component 150 also locates developer data mapped to this code change data.

The test case selection component 150 then generates a machine learning model ("prediction model") that correlates the mapped developer data with the test case failure. For example, the correlation can be based upon a range of electrodermal response values mapped to code change data associated with one or more test case failures. The prediction model can be built using any appropriate machine learning technique (e.g., k-nearest neighbor imputation, synthetic minority oversampling technique, multilinear logistic regression, mixture density network, Bayesian prediction, logistic regression, clustering algorithms, independent component analysis, Markov decision processes, etc.).

New developer and code change data are then collected. This is illustrated at step 230. In some embodiments, the data collection component 130 automatically collects developer and code change data when the monitored developer is identified in the software testing environment 110 (e.g., by facial or name recognition, logging into a profile, etc.). In other embodiments, developer and code change data are collected when an option for data collection has been selected (e.g., a preset selection or a selection entered by a user). The new developer data and new code change data are gathered by the data collection component 130, and added to the developer profile 140. The data collection component 130 also maps the new developer data to the new code change data based on temporal relationships between items of the data. These processes can be carried out using substantially the same techniques as the developer and code change data collection at step 210.

At least one of the sensors 120 used to collect developer data at step 230 is the same type of sensor as a sensor 120 used to collect developer data at step 210. However, new developer data collection at step 230 can optionally include data collected by more than one type of sensor 120. The developer data can be continuously collected by the data collection component 130. However, the data collection component 130 can also collect developer data only when it detects that code change data is being entered. For example, when the monitored developer is working on a task that is unrelated to code changes in the software to be tested, the data collection component 130 can cease collecting new developer data. The data collection component 130 can also cease collecting developer data when the monitored developer pauses work for a predetermined amount of time (e.g., five minutes, ten minutes, 30 minutes, etc.) without leaving the workstation or turning off the sensors 120.

Based on the prediction model and the new developer and code change data, a probability of failure is determined for one or more test cases. This is illustrated at step 240. The test case selection component 150 generates this probability based on the prediction model generated at step 220 and the new data collected at step 230. The probability of test case failure occurring when code associated with the new code change data is tested depends upon the similarity between new developer data mapped to the new code change data and the developer data correlated with test case failure by the prediction model.

For example, code changes can be made by a developer who is monitored by an EDA sensor. Based on the code change, developer, and test case data collected at step 210 and the prediction model generated at step 220, at least one electrodermal response value or range of values can be correlated with test case failure. New developer data, including new electrodermal response values, and new code change data are then collected while code changes are made by the same developer at step 230. The probability of failure for test cases that test areas of altered code can increase in proportion to the similarity between new electrodermal response values mapped to the corresponding code change data and electrodermal response values correlated with test case failure.

It is then determined whether there is an option selected for comparing the probability of failure to a threshold probability. This is illustrated at step 245. The threshold probability can be one or more preset probabilities (e.g., a percent probability such as 50%, 75%, 90%, etc.). However, the threshold probability can also be entered or adjusted by a user. In some embodiments, a user can choose whether to select an option for directing the test case selection component 150 to compare the probability of failure to the threshold probability. In other embodiments, the test case selection component 150 can have a preset selection directing it to compare the probability of failure to the threshold probability. A preset selection can also direct the test case selection component 150 to omit this comparison.

If the option to compare the probability of failure to the threshold probability has been selected, it is determined whether the probability of failure for a test case is above the threshold probability. This is illustrated at step 250. Herein, the phrase "above the threshold probability" is inclusive of probabilities that are at the threshold as well. Further, there can be more than one threshold probability. For example, there can be a first threshold associated with a moderate probability of failure and a second threshold associated with a high probability of failure. However, if it is determined at step 245 that the option to compare the probability of failure to the threshold probability has not been selected, process 200 proceeds to step 270. This is discussed in greater detail below.

If it is determined that at least one test case has a probability of failure above the threshold probability, these test case(s) are flagged. This is illustrated at step 260. A report that identifies flagged test cases and/or corresponding portions of code that may contain errors can be generated. Further, a message or alert can be sent to a software developer indicating that certain code portions are likely to result in test case failure. The report, message, and/or alert are displayed on a user interface. The developer can then decide whether or not to fix the error before running test cases. Further, test cases having probabilities of failure below the threshold probability can be automatically omitted from a test suite.

A test suite is generated and run. This is illustrated at step 270. When step 250 has been included in process 200, and it has been determined that there is a test case with a probability of failure above a threshold probability, step 270 is carried out after the test case flagging at step 260. However, when it has been determined at step 250 that there is not a test case with a probability of failure above a threshold probability, process 200 proceeds directly from step 250 to step 270. In instances where it is determined at step 245 that the option to compare the probability of failure to the threshold probability has not been selected, process 200 proceeds from step 245 to step 270. At step 270, the test case selection component 150 generates the test suite based on the probabilities of failure determined for the test cases at step 240. Each test case in the test suite is then run automatically or manually.

The test suite is an ordered set of test cases for evaluating code portions that have been changed by the developer, though unchanged code portions can be evaluated by the test suite as well. The test suite can be generated by automatically selecting test cases from a set of preexisting test suites (e.g., in a database) in order to form a new test suite. For example, test cases having probabilities of failure above a threshold probability of failure can be selected from preexisting test suites. However, the test suite can also be generated by reordering or modifying an existing test suite. For example, a test suite can be reordered to run test cases in order of highest to lowest probability of failure. Test cases can also be removed from an existing test suite. For example, the generated test suite can be a test suite from which test cases having probabilities of failure below a threshold probability (e.g., test cases that were not flagged at step 260) have been removed.

Additionally, the test case selection component 150 can provide a report providing information such as the test cases' probabilities of failure or areas of code that may contain defects. In some embodiments, the person testing the software can optionally select test cases for the generated test suite based on this information, or make modifications to a test suite generated by the test case selection component 150 (e.g., by including at least one test case having a probability of failure below the lowest threshold probability). In some embodiments, the developer can decide to correct identified code defects before running one or more test cases. Additionally, code defects can be corrected automatically in some embodiments. The generated test suite is then run, and the results of the test cases (test case data) are gathered by the data collection component 130.

When the results of the test cases have been gathered, the prediction model is updated. This is illustrated at step 280. The test case selection component 150 updates the prediction model generated for the developer profile 140 based on the developer and code change data collected at step 230 and the test case data collected at step 270. The test case selection component 150 updates the prediction model via techniques such as those used to build the prediction model at step 220. These machine learning techniques are discussed in greater detail above. When the model has been updated to include the collected developer and code change data, process 200 returns to step 230 to collect new developer data and code change data, and to generate new probabilities of failure using the updated prediction model. Process 200 continues until no new data is received or until instructed to stop.

Figure 3:
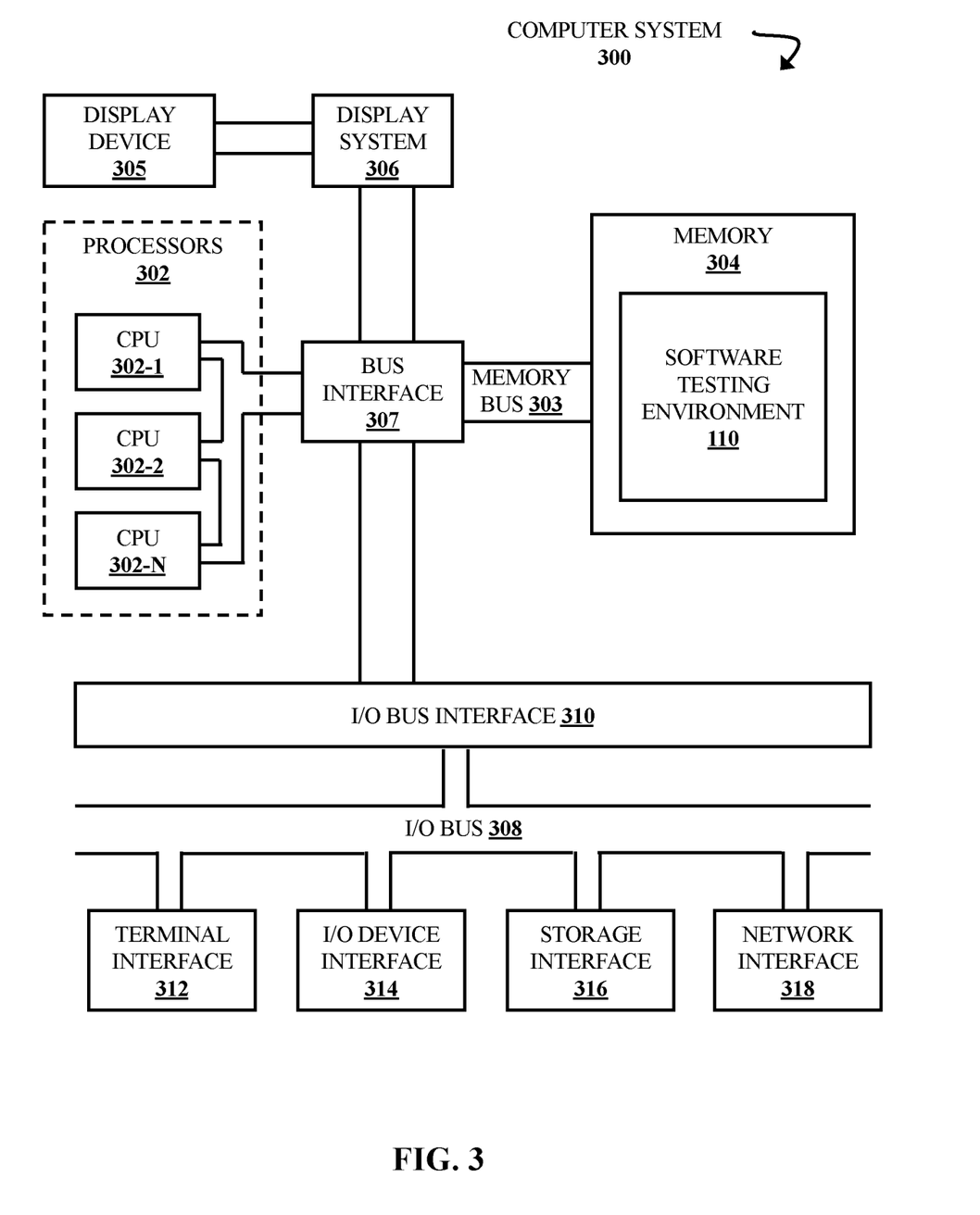
FIG. 3 is a block diagram illustrating a computer system, according to some embodiments of the present disclosure.

FIG. 3 is a high-level block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 310 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The system memory 304 also contains a software testing environment 110 (illustrated in FIG. 1).

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the software testing environment 110 is illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the software testing environment 110 includes instructions that execute on the CPU 302 or instructions that are interpreted by instructions that execute on the CPU 302 to carry out the functions as further described in this disclosure. In another embodiment, the components of the software testing environment 110 are implemented in hardware via semiconductor devices, chips, logical gates, circuits, circuit cards, and/or other physical hardware devices in lieu of, or in addition to, a processor-based system. In another embodiment, the software testing environment 110 includes data in addition to instructions.

Although the memory bus 303 is shown in FIG. 3 as a single bus structure providing a direct communication path among the CPUs 302, the memory subsystem 310, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smartphone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud: the cloud infrastructure is operated solely for an organization. It may be managed by the organization or a third party and may exist on-premises or off-premises.

Community Cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: the cloud infrastructure is made available to the general public or a large industry group and is owned by an organization selling cloud services.

Hybrid Cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
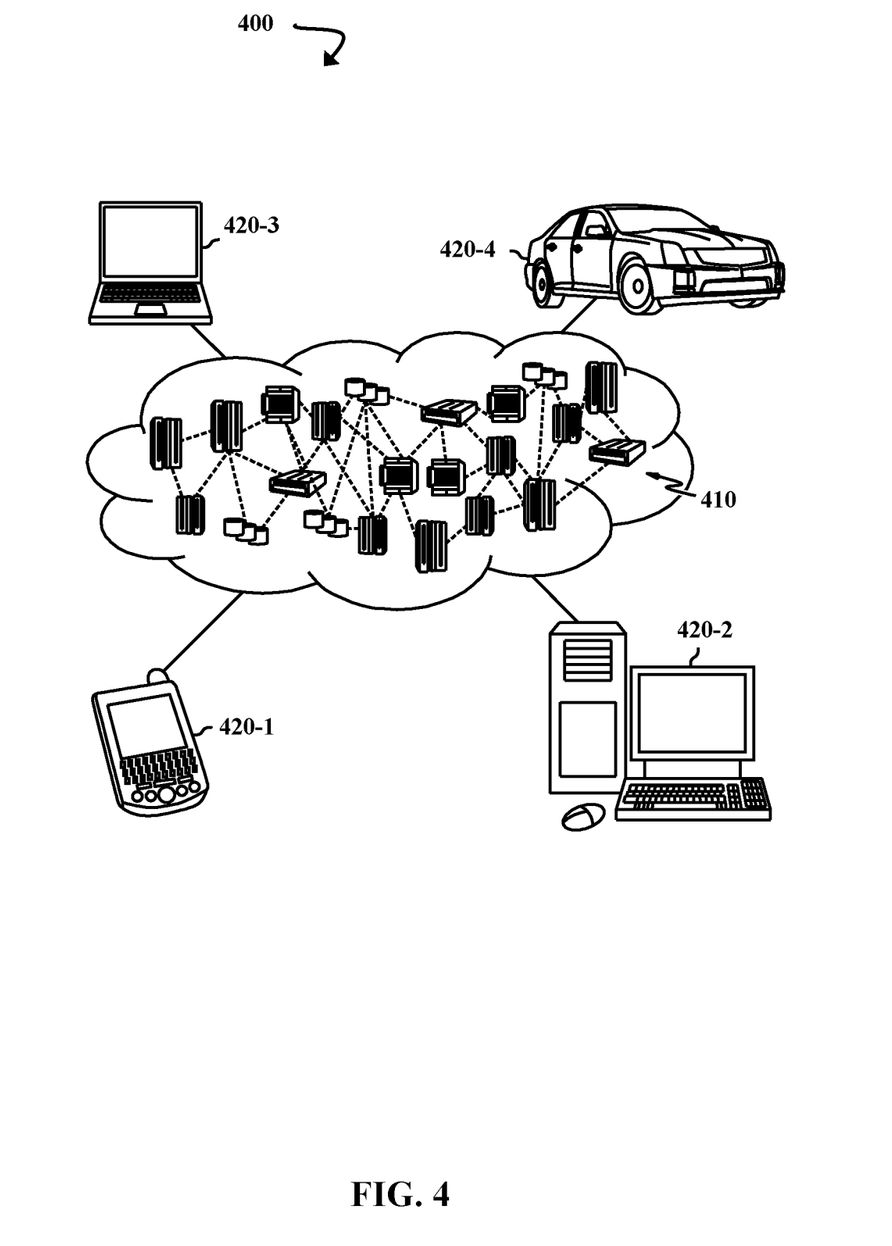
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, a personal digital assistant (PDA) or cellular telephone 420-1, a desktop computer 420-2, a laptop computer 420-3, and/or an automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
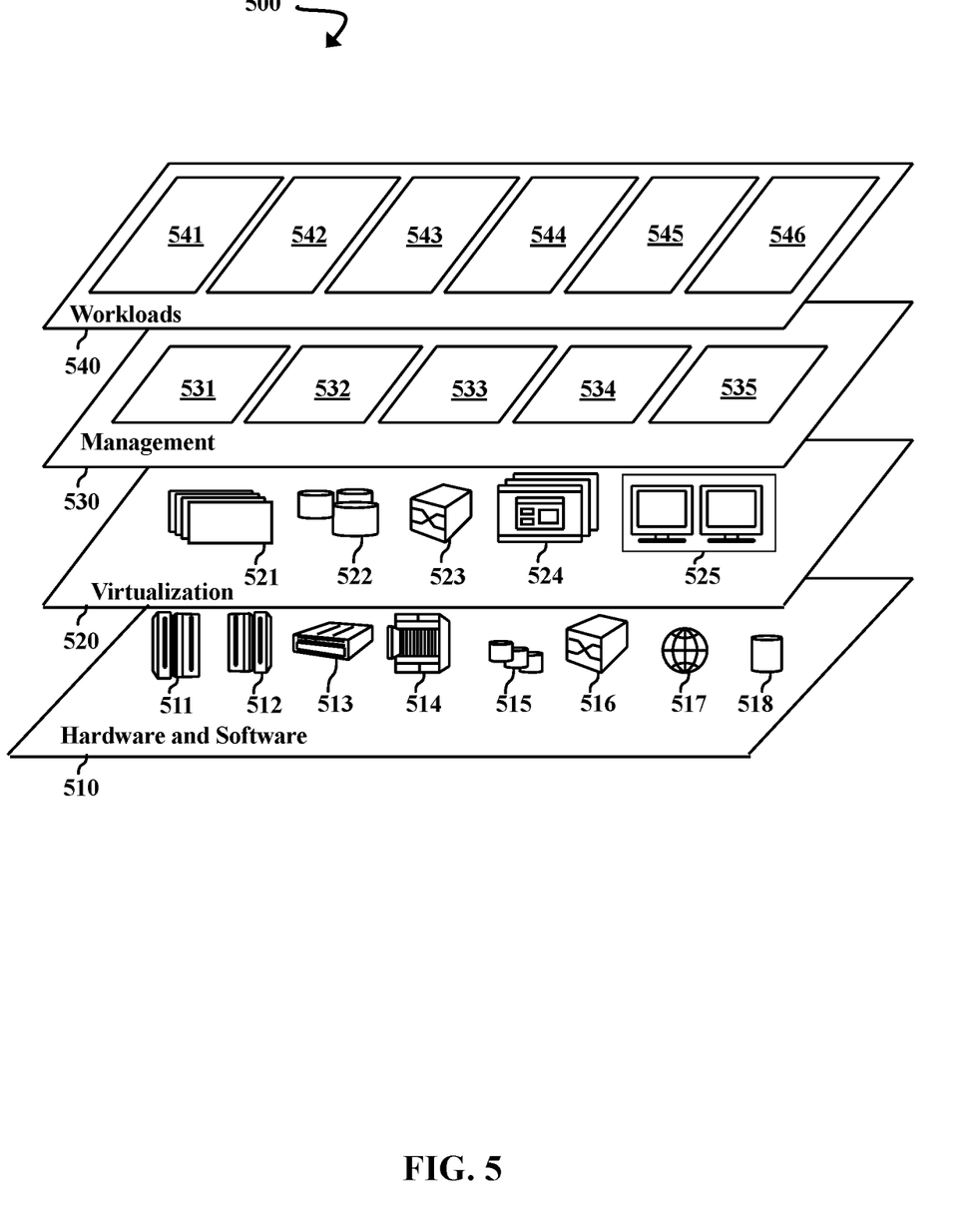
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and selecting test cases 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for selecting test cases, comprising:
   at least one processing component;
   at least one memory component;
   at least one sensor configured to monitor a developer;
   a data collection component configured to:
      gather developer data collected by the at least one sensor;
      gather code change data for changes made by the monitored developer to at least one area of code; and
      map the code change data to the developer data; and
   a test case selection component configured to:
      determine that a first set of the developer data and a first set of the code change data have been gathered by the data collection component;
      run test cases to test the at least one area of code;
      identify items of the first set of the code change data corresponding to each failed test case of the test cases;
      identify items of the first set of the developer data mapped to the items of the first set of the code change data;
      generate a prediction model that correlates test case failure with the developer data;
      determine that a next set of the developer data and a next set of the code change data have been gathered by the data collection component;
      generate, in response to the determination that the next set of the developer data and the next set of the code change data have been gathered, probabilities of failure for the test cases based on the prediction model; and
      generate, based on the probabilities of failure for the test cases, a test suite.

2. The system of claim 1, wherein the developer data is mapped to the code change data based on temporal relationships.

3. The system of claim 1, further comprising a developer profile configured to store the developer data and the code change data.

4. The system of claim 1, wherein the developer data comprises biometric data.

5. The system of claim 1, wherein: the test case selection component is further configured to determine that at least one of the test cases has a probability of failure above a threshold probability.

6. The system of claim 5, wherein the generating the test suite comprises omitting the at least one of the test cases from the test suite.

7. A method of selecting test cases, comprising:
monitoring a developer with at least one sensor;
gathering a first set of developer data collected by the at least one sensor;
gathering code change data for a first set of changes made by the monitored developer to at least one area of code;
mapping the code change data for the first set of changes to the first set of developer data;
running test cases to test the at least one area of code;
identifying items of the code change data for the first set of changes that correspond to each failed test case of the test cases;
identifying items of the first set of developer data mapped to the identified items of the code change data for the first set of changes;
generating a prediction model that correlates test case failure with the developer data;
gathering a next set of developer data collected by the at least one sensor;
gathering code change data for a next set of changes made by the monitored developer to the at least one area of code;
mapping the code change data for the next set of changes to the next set of developer data;
generating, in response to the gathering the next set of developer data and the code change data for the next set of changes, probabilities of failure for the test cases based on the prediction model; and
generating, based on the probabilities of failure for the test cases, a test suite.

8. The method of claim 7, wherein the mapping the developer data to the code change data is based on temporal relationships.

9. The method of claim 7, wherein the at least one sensor is a biometric sensor.

10. The method of claim 7, wherein the at least one sensor is an electrodermal activity sensor.

11. The method of claim 7, further comprising ranking the test cases from highest probability of failure to lowest probability of failure.

12. The method of claim 11, wherein the generating the test suite includes ordering the test cases according to the ranking.

13. The method of claim 7, further comprising:
determining, based on the prediction model, that at least one of the test cases has a probability of failure above a threshold probability; and
generating a report indicating the at least one of the test cases.

14. The method of claim 7, further comprising:
running the test suite to test the at least one area of code;
identifying items of the code change data for the next set of changes that correspond to failed tests cases of the test suite;
identifying items of the next set of developer data mapped to the identified items of the code change data for the next set of changes; and
updating the prediction model based on the identified items of the next set of developer data and the identified items of the code change data for the next set of changes.

15. A computer program product for test case selection, the computer program product comprising a computer readable storage medium having program instructions embodied therewith, the program instructions executable by a processor to cause a device to perform a method comprising:
monitoring a developer with at least one sensor;
gathering a first set of developer data collected by the at least one sensor;
gathering code change data for a first set of changes made by the monitored developer to at least one area of code;
mapping the code change data for the first set of changes to the first set of developer data;
running test cases to test the at least one area of code;
identifying items of the code change data for the first set of changes that correspond to each failed test case of the test cases;
identifying items of the first set of developer data mapped to the identified items of the code change data for the first set of changes;
generating a prediction model that correlates test case failure with the developer data;
gathering a next set of developer data collected by the at least one sensor;
gathering code change data for a next set of changes made by the monitored developer to the at least one area of code;
mapping the code change data for the next set of changes to the next set of developer data;
generating, in response to the gathering the next set of developer data and the code change data for the next set of changes, probabilities of failure for the test cases based on the prediction model; and
generating, based on the probabilities of failure for the test cases, a test suite.

16. The computer program product of claim 15, wherein the mapping the code change data to the developer data is based on temporal relationships.

17. The computer program product of claim 15, wherein the at least one sensor is a biometric sensor.

18. The computer program product of claim 15, further comprising ranking the one or more test cases from highest probability of failure to lowest probability of failure.

19. The computer program product of claim 18, wherein the test suite orders the test cases according to the ranking.

20. The computer program product of claim 15, further comprising:
running the test suite to test the at least one area of code;
identifying items of the code change data for the next set of changes that correspond to failed tests cases of the test suite;
identifying items of the next set of developer data mapped to the identified items of the code change data for the next set of changes; and
updating the prediction model based on the identified items of the next set of developer data and the identified items of the code change data for the next set of changes.

* * * * *